T. BERNTSON.
WHEEL.
APPLICATION FILED JUNE 4, 1908.
948,408.
Patented Feb. 8, 1910.
2 SHEETS—SHEET 1.
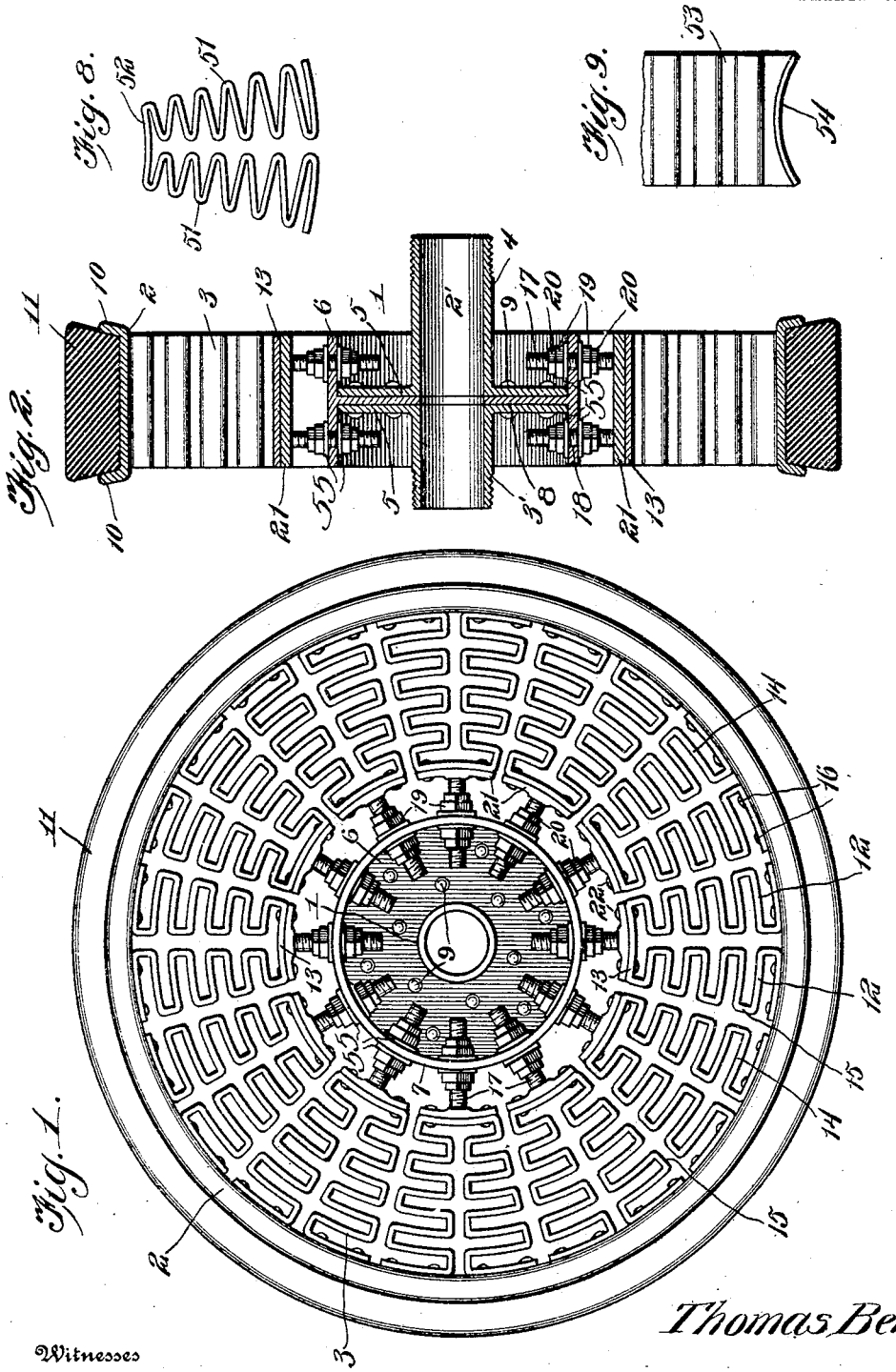
Witnesses
Louis R. Heinrichs
D. W. Gould
Inventor
Thomas Berntson
By Victor J. Evans
Attorney T. BERNTSON.
WHEEL.
APPLICATION FILED JUNE 4, 1908.
948,408.
Patented Feb. 8, 1910.
2 SHEETS—SHEET 2.
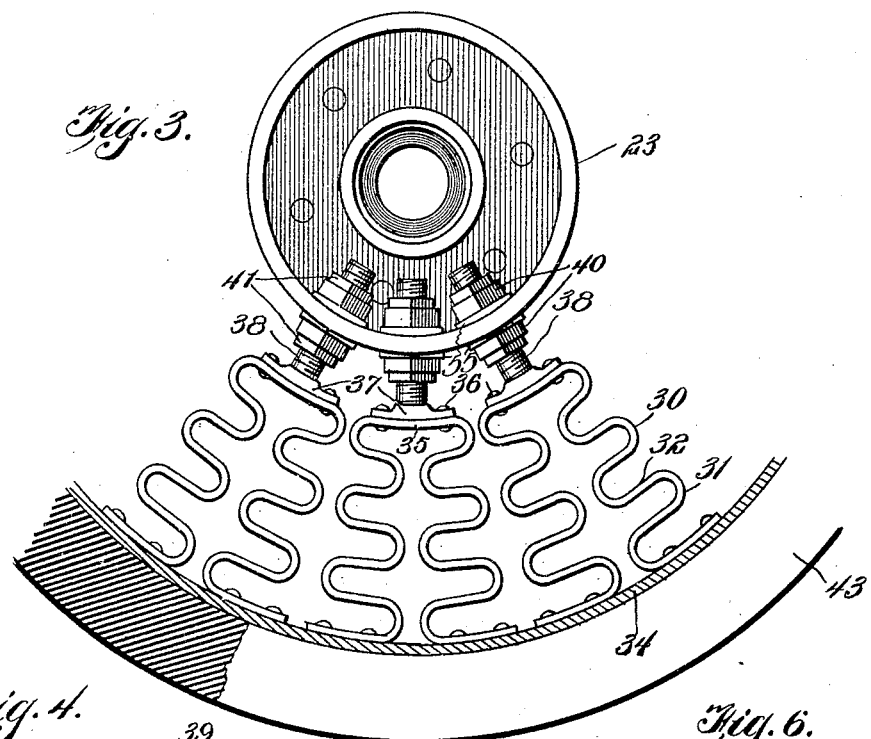
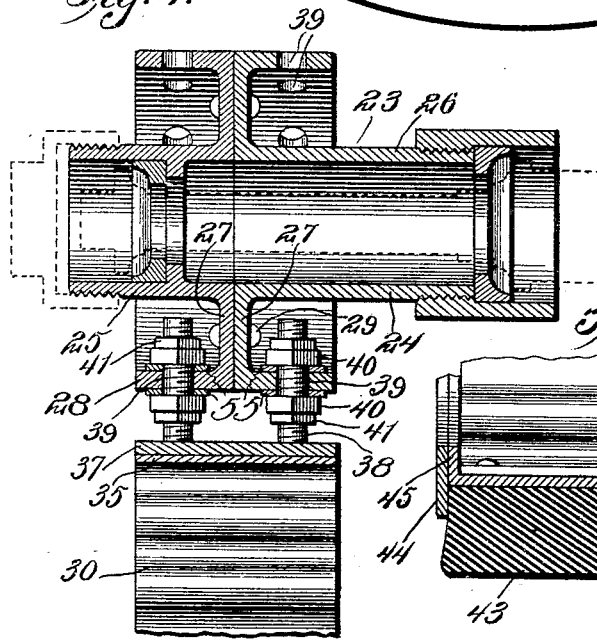
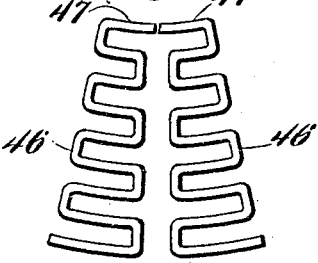
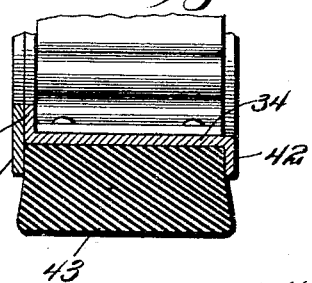
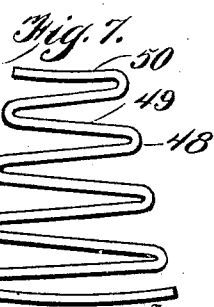
Witnesses
Louis R. Heinrichs
D. W. Gould
Inventor
Thomas Berntson
By Victor J. Evans
Attorney

UNITED STATES PATENT OFFICE.

THOMAS BERNTSON, OF PITTSBURG, PENNSYLVANIA.

WHEEL.

948,408.     Specification of Letters Patent.     Patented Feb. 8, 1910.

Application filed June 4, 1908. Serial No. 436,652.

*To all whom it may concern:*

Be it known that I, THOMAS BERNTSON, a citizen of the United States, residing at Pittsburg, in the county of Allegheny and State of Pennsylvania, have invented new and useful Improvements in Wheels, of which the following is a specification.

The invention relates to an improvement in wheels of the spring type, being particularly directed to a construction in which the springs are arranged between the hub and felly to form a universal yielding connection between these parts, the construction providing for the independent adjustment of the spring with relation to one of the parts to insure an absolutely true arrangement of the felly with relation to the hub.

The main object of the present invention is the provision of a spring wheel in which a series of springs of approximately sinuous form are arranged to provide the sole connection between the hub and felly, the hub being of peculiar construction and the connection of the springs thereto being capable of adjustment to insure a perfect truing of the felly with relation to the hub.

Another object of the invention is to improve and simplify the hub construction whereby it is particularly adapted for use in adjustably supporting the springs and provision is made for the convenient separation and assemblage of the parts of the hub when desired.

The invention will be described in the following specification, reference being had particularly to the accompanying drawings, in which:—

Figure 1 is a view in elevation of a wheel constructed in accordance with my improvement. Fig. 2 is a vertical transverse section of the same. Fig. 3 is a broken section partly in elevation, showing a slightly modified form of wheel structure. Fig. 4 is a sectional view illustrating the hub structure of the modified form of wheel. Fig. 5 is a broken section showing a modified means of attaching the tire. Fig. 6 is an elevation showing a modified form of spring. Fig. 7 is an elevation of another form of spring. Fig. 8 is an elevation showing another form of spring. Fig. 9 is a broken elevation of a different form of spring primarily adapted for a rounded felly.

Referring particularly to Figs. 1 and 2, wherein is shown the preferred form of wheel structure, the improved wheel includes a hub 1, a felly 2, a series of springs 3, forming the sole connection between the hub and felly, said springs thereby serving as the resilient spokes of the wheel. The hub 1 is approximately of the usual type employed in the commercial automobile wheel in so far as the boxing 2' is concerned, which, as shown in Fig. 2, is made up in two independent sections 3' and 4, the proximate ends of each of which are formed with annular outwardly projecting flanges 5. The boxing is designed to be interiorly provided with fixed members of a ball bearing for properly supporting the axle, the construction of these features being immaterial so far as the present invention is concerned. In connection with the boxing the hub includes a spring supporting member 6, made up in the form of an annular rim 7 having a central inwardly extending web 8, so that the supporting member is of T-shape in cross section. The web 8 is approximately of a height corresponding to the height of the flanges 5 of the box section, and in assembling the hub parts the web 8 is designed to fit between the flanges 5 of the box section, as clearly shown in Fig. 2, the flanges and web being secured by rivets 9 to provide a substantial structure. In this arrangement of the parts the rim 7 of the supporting member is disposed concentrically with the box and projects equally in both directions beyond the flanges 5. The felly 2, which is preferably an annular metallic strip of the desired diameter, is, in the preferred form illustrated in Fig. 2, provided with outwardly projecting edge flanges 10, between which the tire 11 is secured by frictional engagement with said flanges or in any other appropriate manner. The springs 3, which form the spokes of the wheel, are, in the preferred form, of the double type comprising duplicate sections 12 integrally connected at their relatively inner ends by a cross strip 13, which in longitudinal section is formed on a curve corresponding to the curvature of the rim 7 of the supporting member. Each of the sections 12 of the spring member is bent into sinuous form, the cross portions 14 of which curve in longitudinal section to correspond to the curvature of the cross bar 13, while the end portions 15 project on right lines relative to the cross portions. Each successive cross portion 14 of the spring section outwardly from the cross strip 13 is gradually increased in length so that the end portions 15 will, when the sections are in place, aline radially of the wheel. The free terminals of each section 12 of the spring are secured, through the medium of rivets 16, directly to the felly 2, while the cross strip 13 joining the two sections of each spring is directly connected to the rim 7 of the supporting member 6 of the hub, through the medium of bolts 17 which pass loosely through openings 18 in the rim 7 and are secured in place by adjusting nuts 19 engaging each bolt on opposite sides of the rim and secured in adjusted position through jam nuts 20. The bolts are preferably provided in pairs for each spring 3, being secured at their relatively outer ends to a plate 21, which is in turn secured by rivets 22 to the cross strip 13 of the spring. The bolts of each pair are preferably alined transversely of the wheel, so that one of each of said pair of bolts will pass through one section of the rim on one side of the flanges 5.

In Figs. 3, 4, and 5 is shown a slightly modified form of wheel structure in which the hub 23 includes a boxing 24 made up in two sections 25 and 26. The proximate or contacting ends of the section are formed with annular outwardly extending flanges 27, and the outer edges of each of these flanges are formed with laterally projecting rims 28, said rims extending parallel to and concentric with the surface of the box section of which they form a part. In assembling the parts of this form of hub the flanges 27 are secured together by rivets 29, in which position the rims 28 will together form a rim portion corresponding in all respects to the rim 7 of the preferred form. The spring 30 in the modified form is also made up in two sections, each of which is of sinuous formation, varying from the preferred form in that the end sections 31 are rounded rather than projected at right angles to the cross sections 33. The terminals of the sections of the spring 30 of the modified form are riveted at 33' to the felly 34, while the relatively inner cross strip 35, integrally connecting the spring sections, is riveted at 36 to a plate 37 carrying spaced bolts 38, as in the preferred form. The bolts 38 are designed to be passed through openings 39 in the rims 28 of the hub, being secured by adjusting nuts 40 on each side of said rim and coöperating jam nuts 41, as in the preferred form. In the modified form described one edge only of the felly, preferably the inner edge, is formed with an outwardly extending lip flange 42 to receive and engage the tire 43, the opposite edge of the tire being secured in place by a plate 44, designed to be secured to the felly, preferably to an inwardly projecting edge flange 45 thereof, said plate 44 projecting beyond the outer surface of the felly to engage the tire in opposition to the flange 42. In this form of tire connection the tire may be applied to the wheel felly prior to the application of the securing plate 44, thereby providing a simple and convenient means for securing the tire in place.

In Fig. 6 I have shown a slightly modified form of spring, which in structure is identical with that shown in the preferred form except that the sections 46 are independent, their end strips 47 being designed to be placed in alinement and to be together riveted to the bolt plate, previously described. This form of spring provides for the ready replacement of one section in the event such should be desired without necessitating the entire removal of the spring.

In Fig. 7 I have shown another form of spring, made up in the form of a single section 48, the successive cross portions 49 of which are projected at a substantial inclination with respect to each other. The width of the section 48 in this form is intended to correspond approximately to the similar dimension of both sections of the springs previously described, the inner cross strip 50 being adapted to be riveted directly to the bolt carrying plate, as in the preferred form.

In Fig. 8 I have shown another form of spring, made up in two sections 51 each approximately of the form shown in the single section in Fig. 7, both of the sections 51 being connected by an integral inner cross strip 52, thereby providing a single spring including two sections, and differing from the preferred form only in that the formation of the sinuous outline varies from that shown in the preferred form.

In Fig. 9, which is intended to illustrate any of the forms of springs previously described, the spring 53 differs from the other spring in that the terminal sections arranged to engage the felly are curved in transverse section, as at 54, whereby the springs are adapted for connection with a concaved felly designed to receive a rounded or half rounded tire.

In all of the forms described the springs are designed to be of a width transverse the wheel corresponding approximately to the similar dimensions of the felly and rim of the supporting member, so that a broad positive bearing is provided between the hub and felly.

One of the important features of the present invention is the use of the adjusting bolt for connecting the inner ends of the springs to the hub. In the use of these bolts it is obvious that the respective springs may be independently adjusted as desired, thereby insuring an absolute truing of the felly with relation to the hub. Furthermore, by the use of two bolts for each spring alined transversely of the wheel, it is obvious that I am enabled to not only tension the spring radially of the wheel but adjust them transversely thereof, thereby providing a simple and certain means for affording any desired adjustment to any particular spring or springs in the wheel structure. The form and length of spring gained thereby is material in the present invention, it being obvious that under the load strain the relatively lowest spring will directly sustain the load causing the felly at that point to approach the hub. This movement of the felly relative to the hub will, of course, immediately tension and be resisted by practically every other spring in the wheel, the relatively upper spring resisting the upward movement of the felly and the side spring also resisting such movement. This distribution of the strain tends, of course, to greatly increase the effective life of the wheel, while at the same time produces a more perfect cushioning than would be possible under other circumstances.

In continued use the resisting effect of the springs will, of course, be gradually reduced, and this without a compensating means would seriously detract from the effectiveness of the wheel. This objection, however, is overcome in the present construction, as by the adjustment of the springs permitted through the use of the bolt described, the tension of any one or more of the springs may be readily and easily corrected without dismantling the wheel, whereby the most perfect cushioning effect can be maintained under all conditions.

It is understood, of course, that washers 55 are arranged on the bolts 17 and 38 on each side of the rim 7 and rims 28, whereby to provide a square bearing surface for the respective adjusting nuts.

Having thus described the invention what is claimed as new, is:—

1. A wheel including a hub, a felly, and a series of springs connecting the hub and felly, each of said springs comprising duplicate sections connected at their relatively inner ends by an integral cross strip, each spring section being of sinuous form having the cross portions of gradually increasing length from the inner to the outer end of the spring, whereby the end portions of the section aline radially of the wheel when in place therein.

2. A wheel including a hub, a felly, a series of springs connecting the hub and felly, said springs including a section of sinuous form having the cross portions of gradually increasing length from the inner to the outer end of the spring, and independent means alined longitudinally of the hub and adjustably securing each spring and hub together.

In testimony whereof I affix my signature in presence of two witnesses.

THOMAS BERNTSON.

Witnesses:
    DAVID W. GOULD,
    JOHN L. FLETCHER.